(12) United States Patent
Fenton et al.

(10) Patent No.: US 7,245,912 B1
(45) Date of Patent: Jul. 17, 2007

(54) MOBILITY MANAGEMENT

(75) Inventors: Christopher J Fenton, Ipswich (GB); John A Lyle, Ipswich (GB); Alan J Clapton, Capel St Mary (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/936,178

(22) PCT Filed: Mar. 7, 2000

(86) PCT No.: PCT/GB00/00818

§ 371 (c)(1),
(2), (4) Date: Sep. 10, 2001

(87) PCT Pub. No.: WO00/59188

PCT Pub. Date: Oct. 5, 2000

(30) Foreign Application Priority Data

Mar. 31, 1999 (GB) .................................. 9907466.8
Jul. 13, 1999 (EP) .................................. 99305541

(51) Int. Cl.
*H04Q 7/20* (2006.01)
(52) U.S. Cl. ...................... 455/433; 455/417; 455/445

(58) Field of Classification Search ................ 455/411, 455/433, 445, 428, 435, 432, 436, 439, 417, 455/419, 432.3
See application file for complete search history.

(56) References Cited

U.S. PATENT DOCUMENTS

| 5,724,658 | A | * | 3/1998 | Hasan ......................... 455/445 |
| 5,734,700 | A | * | 3/1998 | Hauser et al. .............. 455/413 |
| 5,758,281 | A | * | 5/1998 | Emery et al. ................ 455/428 |
| 5,799,249 | A | * | 8/1998 | Kennedy et al. ............ 455/411 |
| 5,978,673 | A | * | 11/1999 | Alperovich et al. ........ 455/417 |
| 5,978,678 | A | * | 11/1999 | Houde et al. ................ 455/433 |
| 6,038,451 | A | * | 3/2000 | Syed et al. .................. 455/445 |
| 6,349,205 | B1 | * | 2/2002 | Fang et al. .................. 455/419 |
| 6,560,455 | B2 | * | 5/2003 | Amin et al. ............. 455/432.3 |

* cited by examiner

*Primary Examiner*—Creighton Smith
*Assistant Examiner*—Md S A Elahee
(74) *Attorney, Agent, or Firm*—Nixon & Vanderhye P.C.

(57) ABSTRACT

A user is registered to use telecommunications services provided by a home service provider in a wired home network. When the user travels, the user may be provided with telecommunications services by another service provider operating in a wired visited fixed network. The user "attaches" himself/herself to the visited fixed network which includes nominating a telephone to which calls made to a user's personal number may be forwarded. The user is also assigned a prefix number which enables him/her to make calls from any phone in the visited fixed network.

18 Claims, 6 Drawing Sheets

MOBILITY MANAGEMENT

BACKGROUND

1. Technical Field of the Invention

The present invention relates to mobility management within a fixed communications system.

2. Description of Related Art

The re-directing of a call to a user-specified telephone, whether fixed or mobile, is known as call-forwarding. Call-forwarding is especially useful when trying to contact a user who is on the move in a fixed telephone network, where telephones, rather than people, are ascribed numbers. In one example, the user is given a "personal" telephone number. The user directs the network to forward all calls made to the personal number to a particular fixed telephone (the "borrowed" telephone). When the user moves, the user instructs the network to forward calls to a new fixed telephone. An example of a call-forwarding service in the United Kingdom is British Telecommunications plc's Flexinumber™ service. Not only can this service be used to forward calls within the UK, but it can be used to forward calls to another network located in another country such as the United States of America.

However, personal numbering has several limitations. Firstly, the personal number can only be used to receive calls. The user must make other arrangements if he wishes to make calls and does not want to burden the owner of the "borrowed" telephone with the cost of his calls. To provide full mobility, the personal number must allow the user to make calls from a "borrowed" telephone and for the calls to be charged to the personal number account. Secondly, the user is always tied to his home network. The user may, temporarily, want to use the services provided by a foreign service provider, in a foreign network, as if he were a subscriber to the foreign service provider.

Such facilities are, of course commonplace in cellular telephony systems such as GSM (Global System for Mobile Communications), in which the user takes the telephone terminal equipment (the handset) with him and the handset and network are designed to allow automatic registration of the handset with a local node ("base station") of the network, as is well known in the art. However, in this case the user identity is associated with the termination equipment itself. Similarly, in the "Mobile IP" (internet protocol used to connect a terminal to the internet, the terminal itself identifies the user.

SUMMARY OF EXEMPLARY NON-LIMITING EMBODIMENTS

In a fixed network the network termination equipment and associated directory number is permanently associated with a specified physical location and directory number. The present invention is intended to allow a visiting user to make use of a network termination, and associated terminal equipment, without the need to bring any equipment with him. This requirement prevents the user identity being permanently associated with the terminal equipment, as is the case in both cellular telephony and "Mobile IP"

According to the present invention, there is provided a method of providing a user of a home network with use of a visited fixed network, the method comprising registering the user with the visited fixed network, including supplying a visitor node which is located in the visited fixed network with the identity of a user-selected fixed termination and with a first identification number, the first identification number identifying the user and a home node which is located in the home network, and registering the visitor node as a proxy with the home node so as to allow routing by the home node of a call intended for the user to the user-selected fixed termination.

The visitor node may comprise a visitor switching means and a visitor location database. The user-selected fixed termination may be assigned a temporary routing number.

The method may further provide a further user of the home network with use of the visited fixed network and a call intended for the further user may be routed to the user-selected fixed termination.

The visited fixed network may be a public switched telephone network and the method may include supplying a visitor node with the identity of a user-selected fixed termination comprising providing the telephone number of a termination attached to the visited fixed network.

The method may further comprise supplying the user with a second identification number for enabling the user to use the visited fixed network and for enabling the visitor node to record the use of the visited fixed network by the user.

In order to enable the user to use the visited fixed network the user may dial the second identification number and a destination termination number for making a call to the destination termination.

The recorded use of the visited fixed network is supplied to the home node for the purposes of billing.

According to the present invention there is also provided a method of configuring a home network to provide a user of the home network, who is assigned a user number, use of a visited fixed network, the method comprising receiving the identity of a visitor node located in the visited fixed network, storing and associating the identity of the visitor node with the user number and receiving billing data from the visitor node for charging the user.

According to the present invention there is further provided a method of configuring a visitor node to provide a user of a home network use of a visited fixed network in which the visited node is located, the method comprising receiving an identification number for identifying the user and identifying a home node which is located in the home network, requesting and receiving confirmation of registration with the home node and sending to the home node billing data arising from the user's use of the visited fixed network.

According to the present invention there is further provided apparatus for providing a user of a home network with use of a visited fixed network, the apparatus comprising the visited fixed network and a home network, a user-selected fixed termination connected to the visited fixed network; means for registering the user with the visited fixed network, a visitor node located in the visited fixed network, means for supplying the visitor node with the identity of the user-selected fixed termination and a first identification number for identifying the user; a home node located in the home network, and means for registering the visitor node as a proxy with the home node so as to allow routing by the home node of a call intended for the user to the user-selected termination.

According to the present invention there is further provided a telephone network configuration as a home network to provide a user of the home network, who is assigned a user number, use of a visited fixed network, the network comprising means for receiving, from a visitor node located in another network, its identity; means for storing and associating the identity of the visitor node with the user number; and means for receiving billing data from the visitor node for charging the user.

According to the present invention there is further provided a node in a fixed telephone network configurable as a visited node to provide a user of another, home, network use of the network in which the visited node is located, the node comprising means for receiving an identification number for identifying the user and a home node located in the home network, means for requesting and receiving confirmation of registration with the home node and means for sending to the home node billing data arising from the user's use of the visited fixed network.

BRIEF SUMMARY OF THE DRAWINGS

An embodiment of the present invention will now be described, by way of example, with reference to the accompanying drawings, in which.

DETAILED DESCRIPTION OF EXEMPLARY NON-LIMITING EMBODIMENTS

Figure 1:
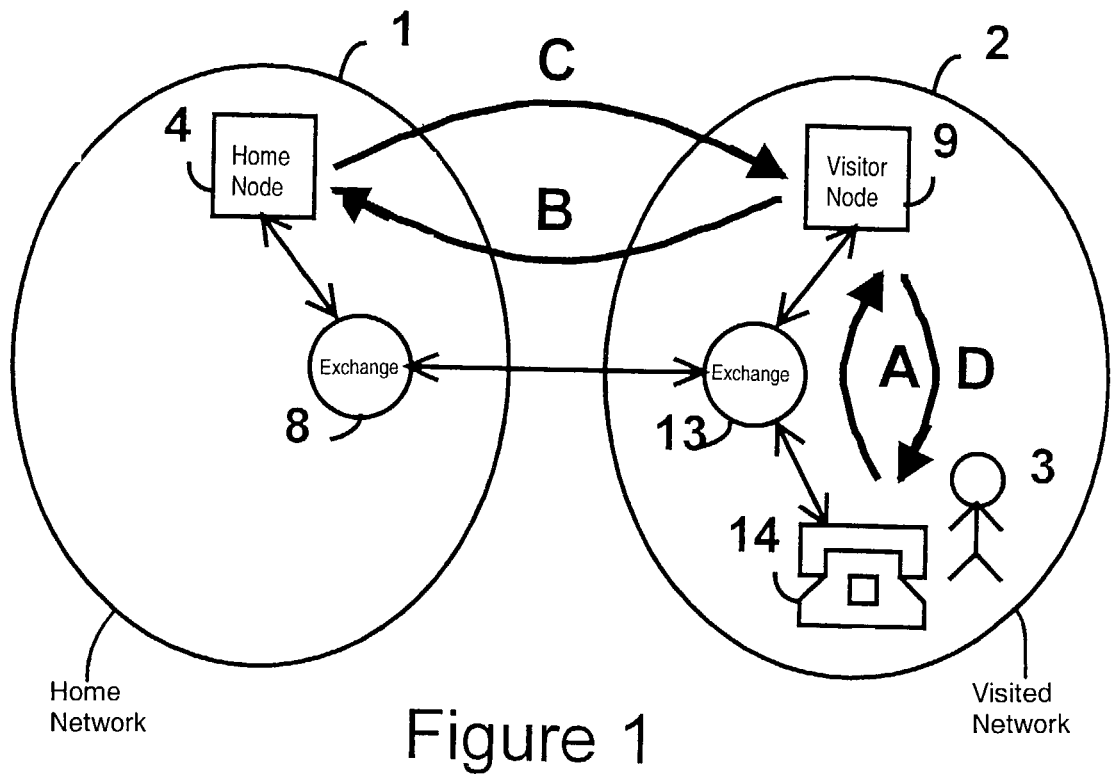
FIG. 1 is a schematic diagram of a communications system comprising a home and a visited network and a process by which user "attaches" himself to the visited network.

Referring to FIG. 1, a communications system comprises a home network 1 and a visited network 2. In this example, both networks are public switched telephone networks (PSTNs). A user 3 is registered with a home service provider which provides services through the home network 1. In this example, the home service provider is the same the network operator, for instance British Telecommunications plc, though this need not be the case. In this example, the service provider provides a voice service to the user 3. The user 3 is also assigned a personal number for call forwarding.

Figure 2:
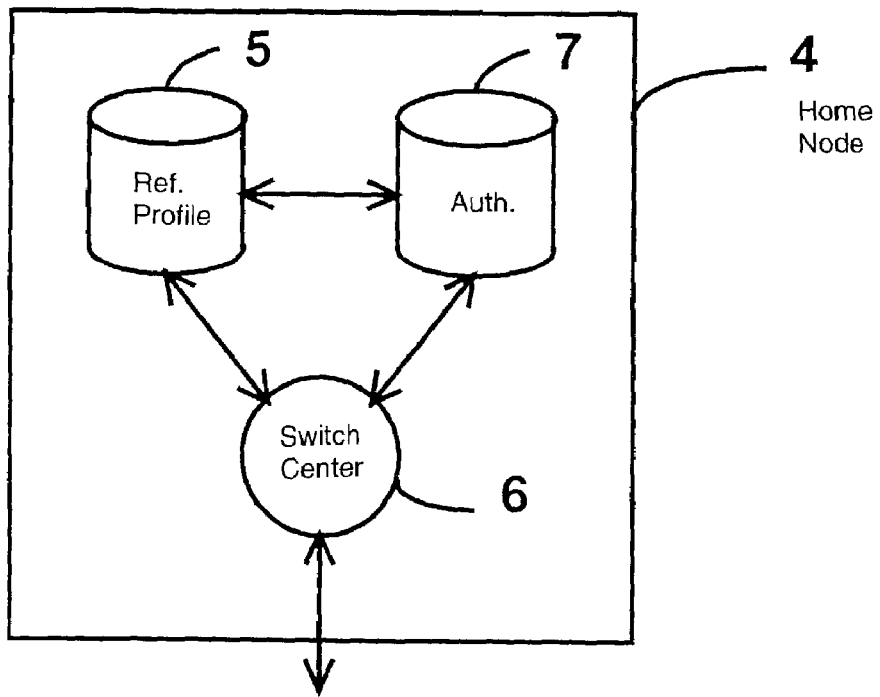
FIG. 2 is a schematic diagram of the internal structure of a home node.

The home service provider has a home node 4, located within the home network 1. Referring to FIG. 2, the home node 4 comprises a reference profile register 5 which holds subscription details for subscribers registered to use services billing data and data relating to foreign networks. The home node 4 also comprises a home gateway switching centre 6 to provide routing access to the home network 1 and an authentication centre 7 to validate the authenticity of users. Other service providers may also have nodes of their own or may share. The home network 1 also comprise a first home network exchange 8, which is one of a plurality of exchanges distributed throughout the home network 1.

Figure 3:
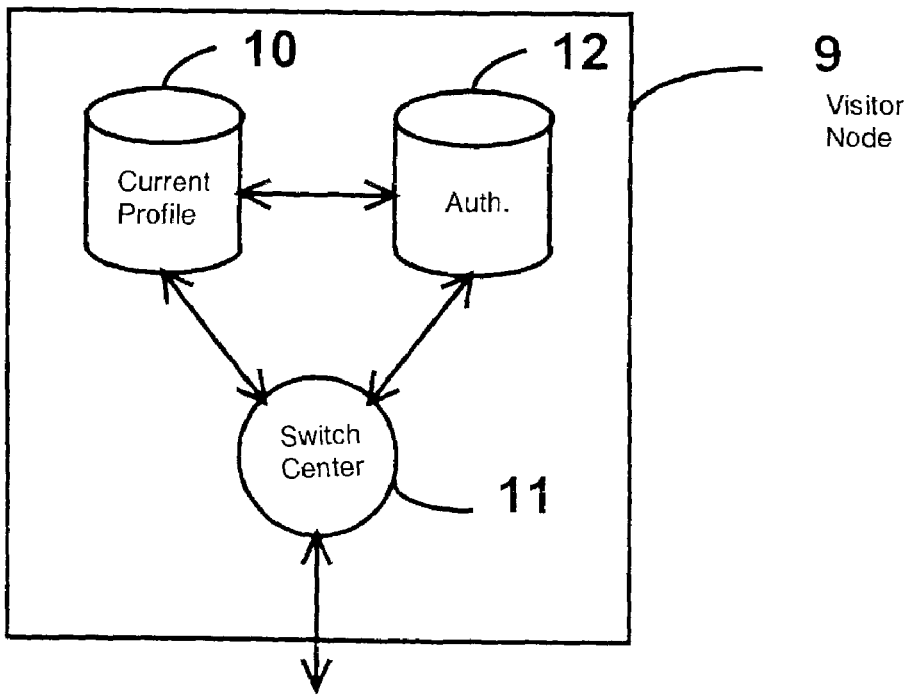
FIG. 3 is a schematic diagram of the internal structure of a visitor node.

The visited service provider has a visitor node 9 located in the visited network 2. Referring to FIG. 3, the visitor node 9 comprises a current profile register 10 which temporarily holds subscription details for subscribers who are registered to use service provided by another service provider, in this case a service provider operating in the home network 1. The visitor node 9 also comprises a visitor gateway switching centre 11 to provide routing access to the visited network 2. Other service providers using the visited network 2 may also have visitor nodes of their own. The visited network 2 also comprises a first visited network exchange 13, which is one of a plurality of exchanges distributed throughout the visited network 2.

Typically, the home node 4 and the visitor node 9 are similar. Each has a dual purpose: to operate as a home node with respect to users registered with the home service provider and to operate as a visitor node with respect to users registered with another service provider. Therefore, the visitor node 9 also comprises a second Authentication centre 12.

The functionality of the home node 4 and the visitor node 9 can be implemented in network service control point running on a Unix platform.

In order to explain operation of the network configuration, an example will described in which the user 3 visits the United States and wishes to be provided with telecommunications services. In this example, the visited network 2 is in a foreign country, the United States, although the home network 1 and the visited network 2 may operate within the same country or region. In addition to simple voice telephone services, the user 3 wishes to be provided with add-on services, not available in the home network 1, such as a sports results service. To be provided with telecommunications service through the visited network provider, the user 3 registers with the visited network 2. The result of registration is that the user 3, becomes "attached" to the visited network 2, thus enabling the user 3 to make full use of services provided by the visited service provider and have calls routed from the home network 1 to the visited network 2.

The process by which the user 3 registers with the foreign service provider will now be described.

Figure 4A:
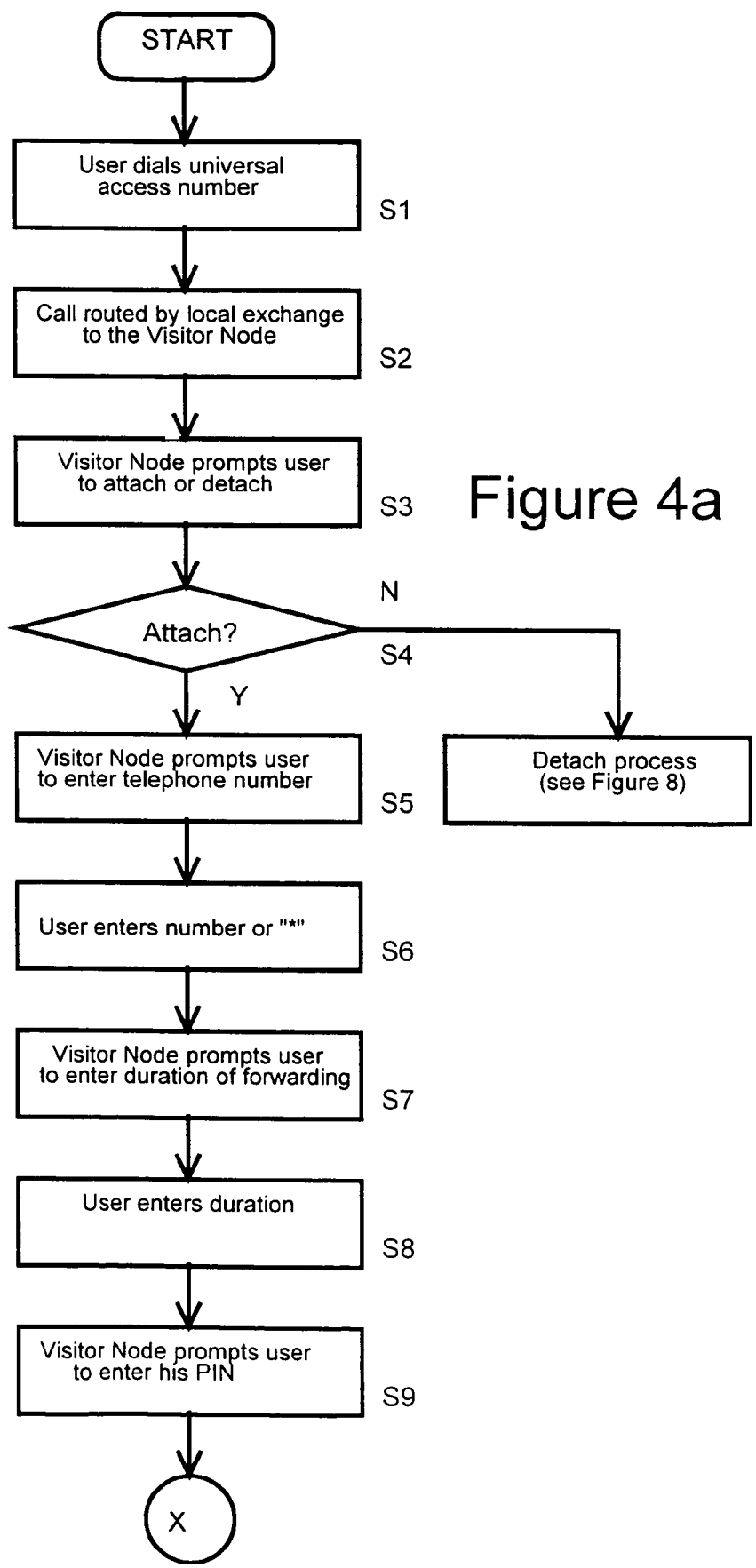
FIGS. 4*a*-4*b* illustrate a process flow diagram of a user attaching to a visited network.
Figure 4B:
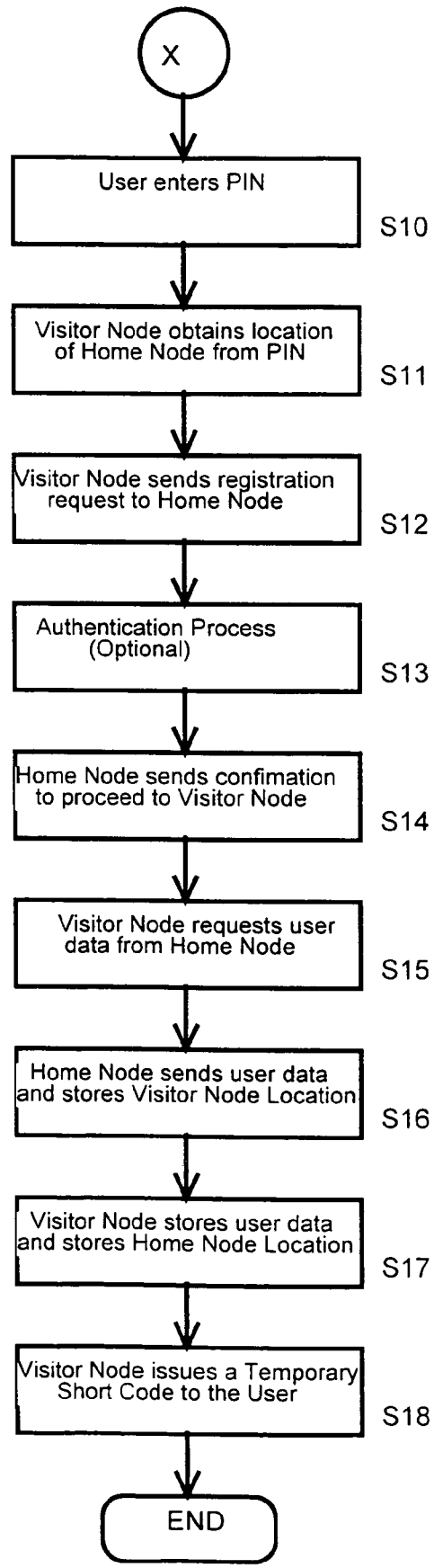

Referring also to FIG. 4, a user 3 dials a universal access number on a telephone 14 located in the visited network 2 (Step S1). This number is recognised by the first visited network exchange 13 and routed to the visitor node 9 (as shown by arrow A) (Step S2). The visitor node 9 prompts the user 3 for information using pre-recorded or synthesised voice messages.

The visitor node 9 enquires whether the user wants to "attach" to or "detach" from the visited network 2 by entering "1" or "3" respectively (Step S3). The user enters "1" on the touch-tone pad of the telephone 14, to indicate that he wishes to "attach" himself to the visited network 2 (Step S4).

The visitor node 9 asks for the number of the telephone to which calls made to the user's personal number should be re-routed (Step S5). There are several options. The user 3 may press the "star" key on the telephone 14 to indicate that calls should be forwarded to the telephone he is using. Alternatively, the user 3 may enter the number of another telephone which may be a fixed telephone or a mobile number. The user 3 may also enter "star" and an extension number if the phone is part of a private branch exchange (PBX) (Step S6).

The visitor node 9 prompts the user 3 to enter the period during which calls are to be forwarded to the selected telephone (Step S7). The user 3 selects a time unit of hours, days or indefinitely, by entering "1", "2" or "0" respectively and the integer number of time units required. For example, if the user wants calls to be forwarded to the selected telephone 14 for 3 days, he enters "2" and then "3" (Step S8).

The visitor node 9 prompts the user 3 for a personal identification number (PIN). The user 3 enters his PIN using the touch-tone pad of the telephone 14 (Steps S9, S10).

The visitor node 9 then proceeds to register itself as a proxy node with the home node 4. The visitor node 9 obtains the location of the home node 4 from the user's PIN and sends a proxy registration request to the authentication centre 7 located in the home node 4 (as shown by arrow B) (Steps S11, S12). The authentication centre 7 checks the validity of the PIN and authenticity of the visitor node and if it is satisfied then the attach process is allowed to continue. An authentication process, similar to that found in mobile communications systems, may be optionally included if the selected telephone 14 is configured to receive a smart card (Step S13).

The authentication centre 7 sends an authorisation code to the reference profile register 5 which permits the register 5 to be modified and user data to be sent to the visitor node 9. The authentication centre 7 informs the visitor node 9 that the authorisation process was successful (as shown by arrow C) (Step S14). The current profile register 10, located in the visitor node 9, requests user data from the reference profile register 5, located in the home node 4 (Step S15). The reference profile register 5 stores the location of the visitor node 9, for re-routing calls to the visited network 2 and sends the requested user data to the current profile register 10 (Step S16). The current profile register 10 stores the requested data and the location of the home node 4, for sending billing information. The current profile register 10 assigns a routing number to the selected telephone 14 and issues the user with a temporary short code (TSI) (as shown by arrow D) (Step S18). The temporary short code is a number which enables the user to make calls using any telephone within the visited network 2. This process is discussed later.

The user 3 is now attached to the visited network 2 and is in a position to receive calls made to his personal number, provided though his home service provider, and to make calls, provided though the visited service provider.

A user-terminated call process will now be described.

Figure 5:
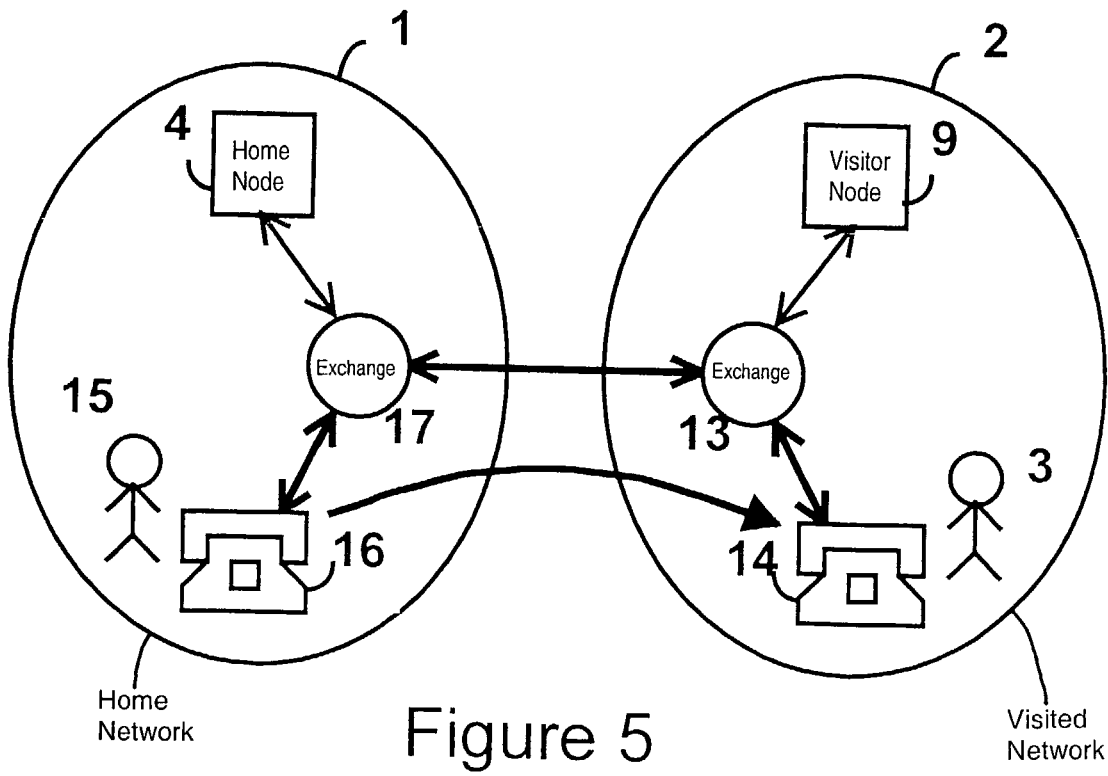
FIG. 5 is a schematic diagram of a user-terminated call process.

Referring to FIG. 5, a second party 15 dials the user's personal number, using a home network telephone 16 located in the home network 1. In this example, the call is received by a second home network exchange 17. The second home network exchange 17 recognises the number as being a personal number and routes the call to the home node 4. On receiving the call, the home node 4 carries out a service control process. Examples of service control processes include unconditional call-forwarding, time-of-day call-forwarding and call screening. The reference profile register 5 determines where the call is to be routed, whether to a voice mail server or to the visitor node 4, as a consequence of the service control process. If the call is to be forwarded, the reference profile register 5 looks up the location of the visitor node 9 and sends a request for the routing number of the selected telephone 14 from the current profile register 10. The current profile register 10 returns a routing number to the reference profile register 5, which in turn sends the routing number to the second home network exchange 17 to enable the call to be set-up.

The home node 4 and the visitor node 9 are configured so as to apportion the cost of the call fairly between the second party 15 and the user 3. In this example, the second party 15 only pays for the portion of the routed call within the home network 2, while the user 3 pays for remainder of the call. User billing data, accrued while the user 3 is in the visited network 2 is held in the Current Profile Register 10.

A user-originating call process will now be described.

Figure 6:
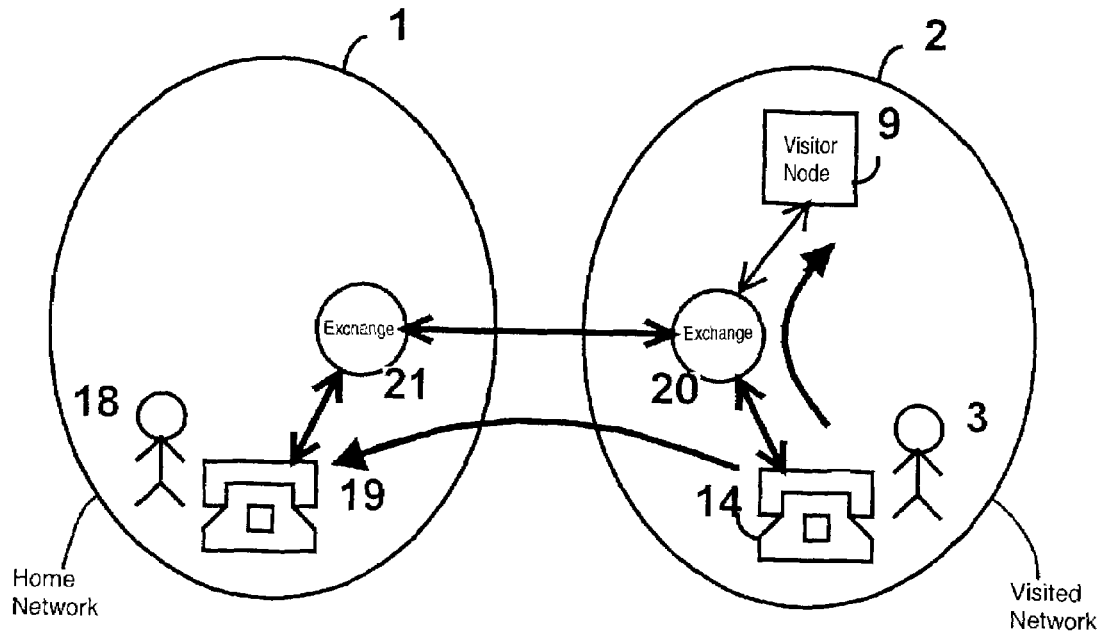
FIG. 6 is a schematic diagram of a user-originated call process.

Referring to FIG. 6, the user 3 wishes to contact a third party 18 located at a destination telephone 19, connected to the home network 1. The user 3 dials a composite number, comprising a prefix number which is the temporary short code and a suffix number which is the number of the destination telephone number 19. In this example, the user 3 makes the call using the selected telephone 14. However he would be free to use any telephone connected to the visited network 2. The call is received by a second visited network exchange 20, which identifies the call as one being made by a visitor to the network, by the prefix number. The second visited network exchange 20, sends a call set-up request to the visitor node 9. In the visitor node 9, the current profile register 10 checks the validity of the temporary short code. In this example, the current profile register 10 also checks whether the destination number is barred. If the temporary short code is valid and the call destination is cleared, the current profile register 10, sends a clearance message on the second visited network exchange 20, which routes the call to the destination number via a third local home network exchange 21.

The visitor node 9 is configured to charge the user 3 for the cost of call at a premium rate with the billing data held in the Current Profile Register 10.

The detach process will now be described.

Figure 7:
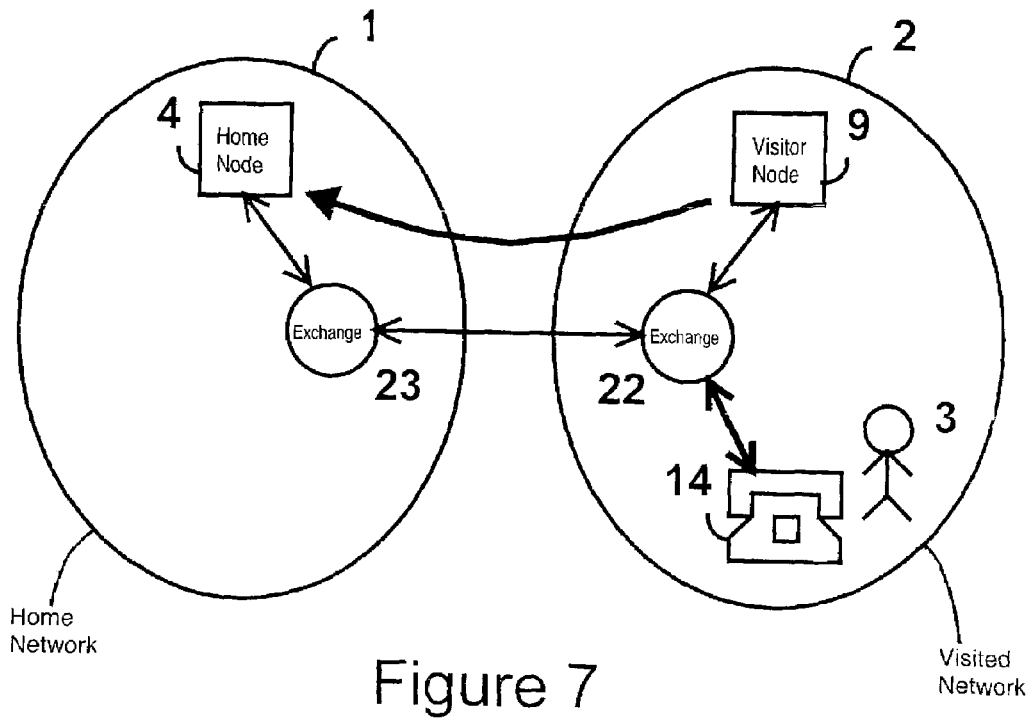
FIG. 7 is a schematic diagram of a user detaching from a visited network.
Figure 8:
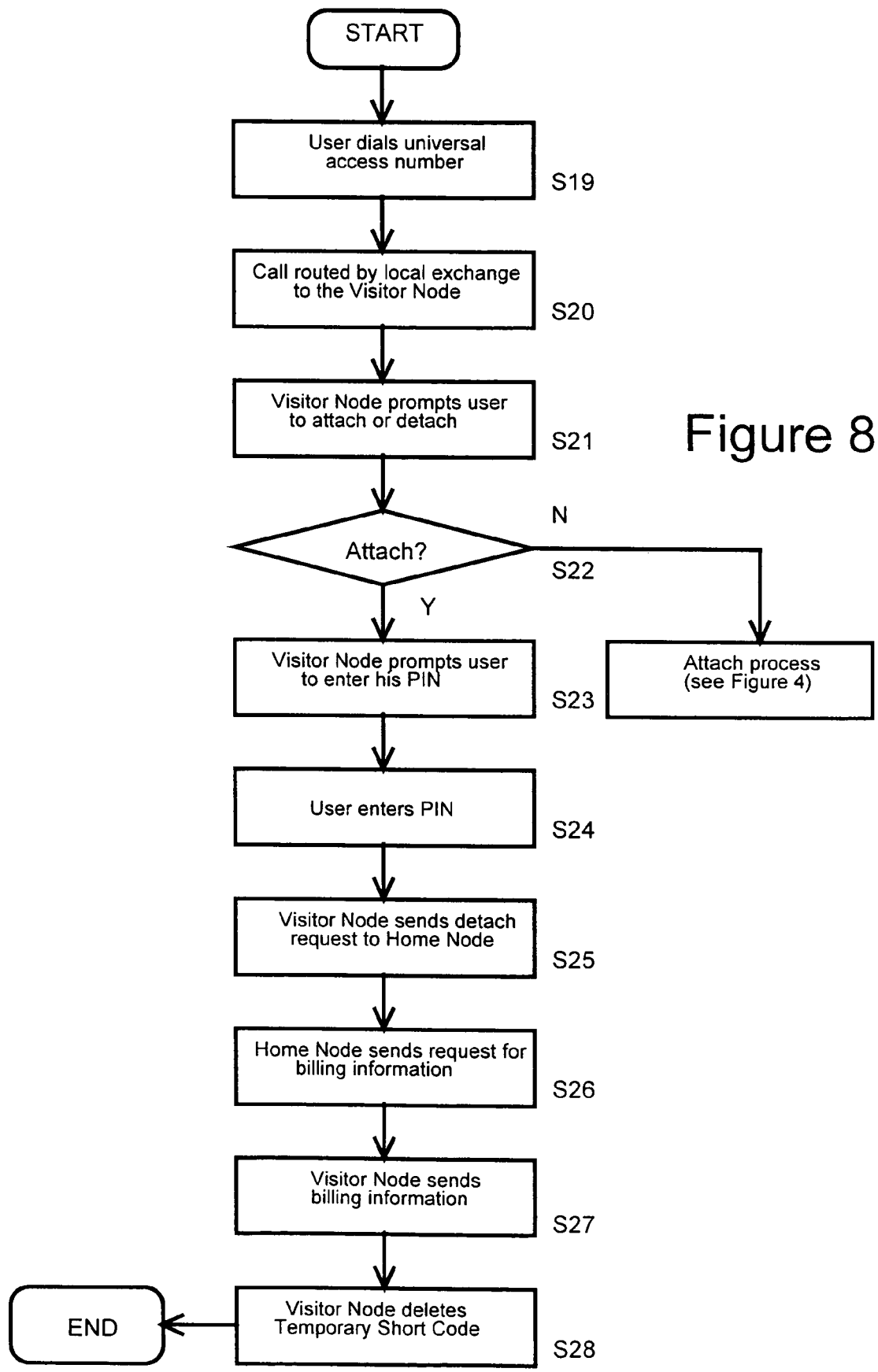
FIG. 8 is a process flow diagram of a user detaching from a visited network.

Referring to FIGS. 7 and 8, the user 3 dials the universal access number on any telephone connected to the visited network 2 (Step S19). In this example, the user 3 make the call on the user-selected telephone 14. This number is recognised by the third visited network exchange 22 and routed to the visitor node 9 (Step S20).

The visitor node 9 prompts the user 3 whether he wishes to "attach" to or "detach" from the visited network 2 by entering "1" or "3" respectively (Step S21). The user 3 enters "3" on the touch-tone pad of the selected telephone 14, to indicate that he wishes to "detach" (Step S22).

The visitor node 9 prompts the user 3 to enter his PIN, which the user 3 does using the touch-tone pad of the selected telephone 14 (Steps S23, S24). No authentication of the PIN is carried out in this example, because the detach process serves to cut-off use of the visited network 2 and so it is less like to be open to abuse by an unauthorised person.

The current profile register 10 sends to the reference profile register 5, a detach request (Step S25). The reference profile register 5 deletes the temporary profile held on the visitor node 9 and returns a confirmation of deletion to the current profile register 10. The reference profile register 5 also sends a request for billing information to the current profile register 10 (Step S26). The current profile register 10 sends the billing information to the reference profile register 5 (Step S27) and plays a confirmation message to the user 3 stating that he is now detached and that billing information has been forwarded to his home service provider. Finally, the current profile register 10 deletes the temporary short code so that the user 3 is no longer able to make calls from the visited network (Step S28).

The user 3 is no longer attached to the visited network 2. Unless he re-attaches himself, calls made to the user's personal number will be forwarded to a voice mail server.

It will be appreciated that many modifications may be made to the embodiment described above.

For example, when a user-terminated call is made, the selected telephone 14 rings with a different cadence to normal, so to indicate that the incoming call is meant for the user 3 rather than the usual recipient.

Many users may select the same telephone for call-forwarding. Each user may be assigned a different ring to distinguish between them.

Authentication can be carried out by placing next to the handset a personal organiser having a microphone and a speaker and running a dual-tone modulation frequency (DTMF) generator program with which tones carrying authentication numbers may be received, generated and sent.

Whilst the described examples make use of PSTNs for the networks 1, 2, it will be understood that other wired networks could be employed, which may include radio links and optical converters.

What is claimed is:

1. A method of providing a user of a home network with use of a visited fixed network, the method comprising:
   registering the user with the visited fixed network, including supplying a visitor node which is located in the visited fixed network with the identity of a user-selected fixed termination and with a first identification number, the first identification number identifying the user and a home node which is located in the home network;
   registering the visitor node as a proxy with the home node so as to allow routing by the home node of a call intended for the user to the user-selected fixed termination; and
   supplying the user with a second identification number for enabling the user to use the visited fixed network and for enabling the visitor node to record the user of the visited fixed network by the user;
   wherein in order to enable the user to use the visited fixed network the user dials the second identification number and a destination terminal number for making a call to the destination terminal.

2. A method to claim 1 wherein the visitor node comprises a visitor switching device and a visitor location database.

3. A method according to claim 1 wherein the user-selected fixed termination is assigned a temporary routing number.

4. A method according to claim 1 further comprising providing a further user of the home network with use of the visited fixed network, wherein a call intended for the further user is routed to the user-selected fixed termination.

5. A method according to claim 1 wherein the visited fixed network is a public switched telephone network and the identity of the user-selected fixed termination comprises providing the telephone number of a terminal attached to the public switched telephone network.

6. A method according to claim 1 wherein the recorded use of the visited fixed network is supplied to the home node for the purposes of billing.

7. A method of claim 1 wherein the user registers with the visited fixed network without a need for any terminal equipment to be brought by the user to a region in which the visited fixed network operates.

8. A method according to claim 1, wherein the home fixed network and the visited fixed network are public switched telephone networks.

9. A method according to claim 1, wherein the home network is a home fixed telephone network and the visited fixed network is a visited fixed telephone network.

10. An apparatus for providing a user of a home network with use of a visited fixed network, the apparatus comprising:
    the visited fixed network and a home network, a user-selected fixed termination connected to the visited fixed network;
    means for registering the user with the visited fixed network;
    a visitor node located in the visited fixed network;
    means for supplying the visitor node with the identity of the user-selected fixed termination and a first identification number for identifying the user;
    a home node located in the home network;
    means for registering the visitor node as a proxy with the home node so as to allow routing by the home node of a call intended for the user to the user-selected fixed termination;
    means for supplying the user with a second identification number for enabling the user to use the visited fixed network, and means for enabling the visitor node to record the use of the visited fixed network by the user; and
    means to enable a user to use the visited fixed network; comprising means for receiving dialed data indicative of the second identification number and the destination terminal number.

11. The apparatus according to claim 10 wherein the visitor node comprises a visitor switching means and a visitor location database.

12. The apparatus according to claim 10 wherein the visited fixed network is a public switched telephone network and the means for supplying the visitor node with the identity of a user-selected fixed termination provides the telephone number of a terminal attached to the public switched telephone network.

13. The apparatus according to claim 10 further comprising means for assigning the user-selected fixed termination is assigned a temporary routing number.

14. The apparatus according to claim 10 further comprising means for providing a further user of the home fixed network with use of the visited fixed network, and means for allowing calls intended for the further user is routed to the user-selected fixed termination.

15. An apparatus according to claim 10 further comprising means for transmitting recorded use of the visited fixed network to the home node from the visited node for the purposes of billing.

16. The method of claim 10 wherein the means for registering the user with the visited fixed network enables the user to register with the visited fixed network without a need for any terminal equipment to be brought by the user to a region in which the visited fixed network operates.

17. The apparatus according to claim 10, wherein the home fixed network and the visited fixed network are public switched telephone networks.

18. The apparatus according to claim 10, wherein the home network is a home fixed telephone network and the visited fixed network is a visited fixed telephone network.

* * * * *